United States Patent

Weaver et al.

[11] Patent Number: 5,778,634
[45] Date of Patent: Jul. 14, 1998

[54] PRODUCT INFEED LINE PRESSURE CONTROLLING APPARATUS FOR PACKER

[75] Inventors: J. Michael Weaver, Madison, Conn.; Johnny W. Stewart, Bristol, Tenn.

[73] Assignee: Standard-Knapp, Inc., Portland, Conn.

[21] Appl. No.: 745,927

[22] Filed: Nov. 7, 1996

[51] Int. Cl.⁶ .................................................. P65B 35/00
[52] U.S. Cl. .......................... 53/250; 53/251; 53/543; 198/836.1; 198/456
[58] Field of Search .................. 53/48.7, 246, 251, 53/252, 534, 539, 543, 566, 250; 198/456, 458, 836.1

[56] References Cited

U.S. PATENT DOCUMENTS

| | | | |
|---|---|---|---|
| 2,756,553 | 7/1956 | Ferguson et al. | 53/251 X |
| 3,444,980 | 5/1969 | Wiseman | 198/456 X |
| 3,767,027 | 10/1973 | Pund et al. | 198/458 X |
| 3,805,476 | 4/1974 | Kawamura et al. | 53/246 X |
| 4,237,673 | 12/1980 | Calvert et al. | 53/251 X |
| 4,479,574 | 10/1984 | Julius et al. | 198/836.1 X |
| 4,844,234 | 7/1989 | Born et al. | 198/458 |
| 4,887,414 | 12/1989 | Arena | 53/48.7 X |
| 4,895,245 | 1/1990 | Bauers et al. | 198/458 |
| 5,237,795 | 8/1993 | Cheney et al. | 53/251 X |
| 5,546,734 | 8/1996 | Moncrief et al. | 53/251 X |

*Primary Examiner*—Daniel Moon
*Attorney, Agent, or Firm*—McCormick, Paulding & Huber

[57] ABSTRACT

In a packaging line adapted to feed articles into a packer and including lane guides defining lanes for columns of articles fed under line pressure to the packer, the lane guides are provided with an offset portion adapted to create a back pressure for reducing the line pressure at the packer. The offset portion provides sufficient resistance to the flow of articles so that the articles entering the packer are more readily accommodated, particularly articles of the type which are compressed by excessive line pressures and tend to upset the operation of the packer as a result of excessive or varying line pressure. The reduced line pressure permits operation of standard packing equipment for the handling of relatively soft and compressable cylindrical plastic bottles.

6 Claims, 1 Drawing Sheet

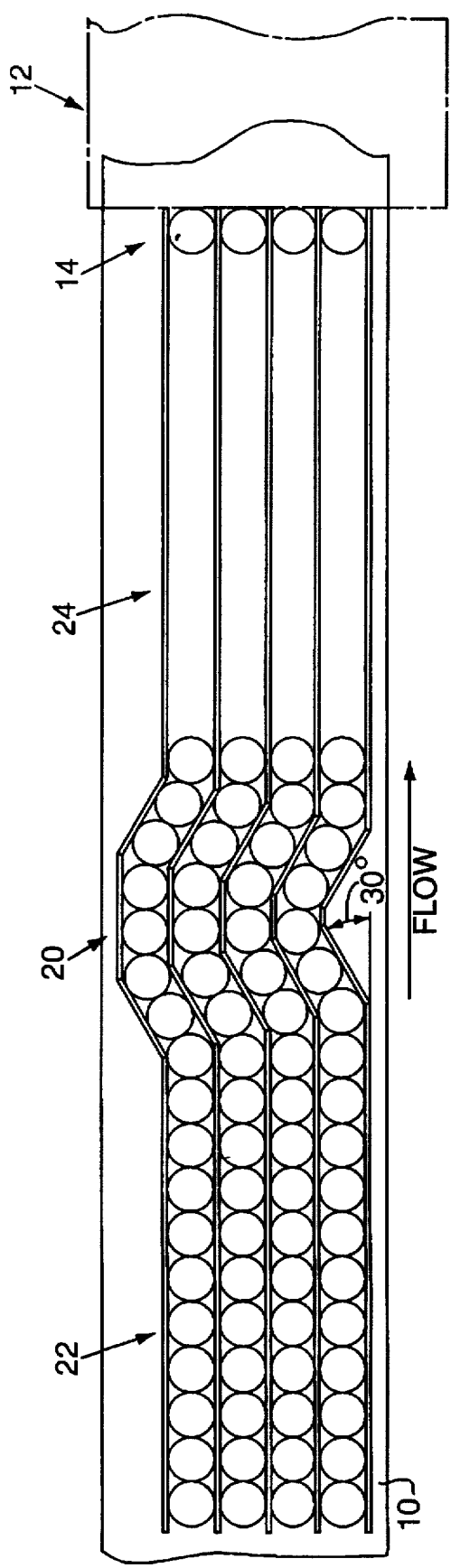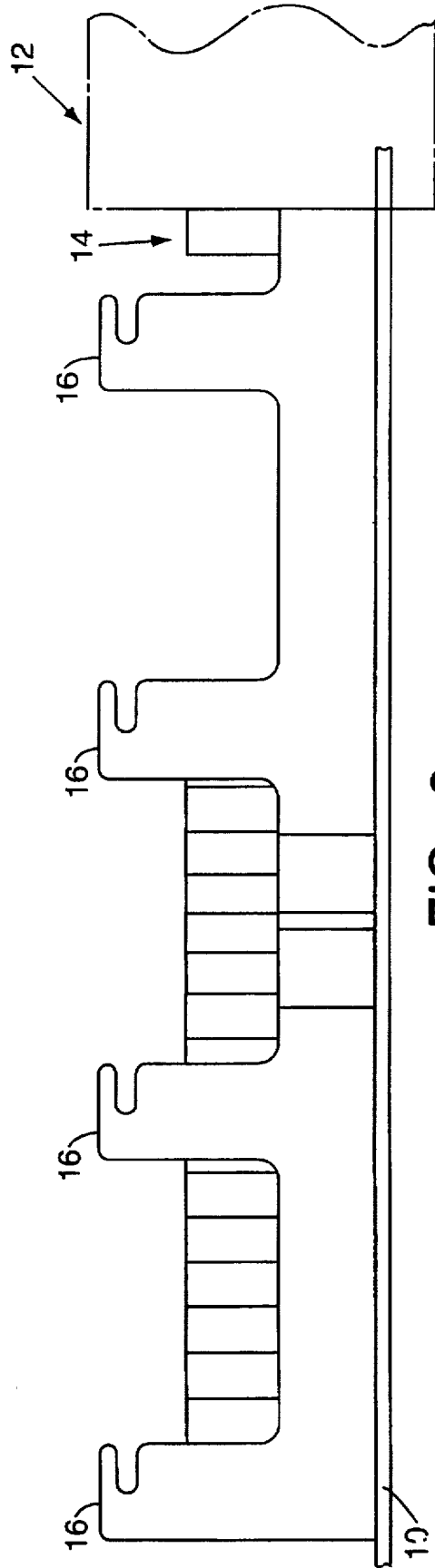

PRODUCT INFEED LINE PRESSURE CONTROLLING APPARATUS FOR PACKER

BACKGROUND OF THE INVENTION

This invention relates generally to improvements for the infeed section of packers, and deals more particularly with means for reducing the line pressure of parallel columns of articles progressing toward a packer of the drop packing variety or of the continuous motion variety which require that separate groups or slugs of articles be segregated for each packing case.

In a typical packaging line, a continuous flow of articles advance by line pressure, usually from an underlying conveyor, into the load station of such a packer, whether it be of the drop packing variety or whether it be of a continuous flow variety which is adapted to create groups or slugs of articles for deposit in continuously moving packing cases.

In the handling of present day plastic bottles, which are somewhat flexible and, hence, compressible in the direction of their movement into the packer, problems are now created either in the packer itself or in the grouper section of the packer where the slugs or groups of articles are formed. This problem is especially pronounced with liquid filled plastic bottles of the type commonly used to market liquid beverages generally. The line pressure of a continuous stream of such articles being fed by an underlying conveyor can create a situation where the articles to be packaged are compressed so that a clear cut shear line cannot be created in a typical drop packer, and so that the grouper section of a continuous motion packer cannot create a gap between the trailing and leading rows of adjacent articles to be grouped so as to accommodate the grouping element or mechanism, whether it be of the pin grouper type or of the flight bar variety.

The present invention seeks to accommodate present day packer technology to the packaging of such relatively flexible or compressible liquid filled plastic bottles by alleviating the line pressure immediately upstream of a drop packer or the grouper section of a continous motion packer.

SUMMARY OF THE INVENTION

The foregoing object of the present invention is accomplished in a packaging line wherein articles to be packaged move downstream under the line pressure created from a continuously moving underlying conveyor. The conveyor feeds the articles downstream between lane guides toward the packer. In accordance with the present invention, the infeed conveyor moves at a speed at least slight greater than the speed at which the packer can accommodate the articles, and thereby creates a line pressure upstream of the packer ($P_o$).

As with prior art configuration, lane guides are provided that define a plurality of parallel article lanes to accommodate a plurality of columns of articles on the infeed conveyor, and each of these columns of articles has a line pressure of at least approximately $P_o$. Slight variations in line pressure between the lanes may occur, but any such variations will be readily accommodated by practicing the invention described herein.

Unlike the prior art lane guides which are essentially parallel to one another along the infeed conveyor, the lane guides of the present invention include offset portions, the first of which offset portions are oriented at an acute angle preferably in the range of 20°–40° and more particularly at 30° to the downstream direction of the articles on the infeed conveyor. A second offset portion is provided immediately downstream of the first portion and defines a second short segment of each column that is offset at essentially the same angle so that the article moves generally parallel to the original downstream direction, but slightly offset from that path.

The preferred embodiment provides a third offset portion in each lane defined by the lane guides so that each column moves back through a 30° in a direction opposite the first offset direction. Finally, a fourth offset portion provides movement of each column of articles in the original downstream direction with the result that all the columns of articles are subjected to a flow restricting offset motion that creates a back pressure($\Delta P$) in the line of articles immediately upstream.

The first and third offset portions have a length of at least approximately twice the diameter of the articles (or twice the lateral spacing between the adjacent lane guides). This geometry assures that the articles do not become jammed in the offset portions just described.

In the preferred embodiment, the plurality of paths defined by a plurality of such offset portions are generally parallel one another, and in further accordance with the invention, the second offset portions are oriented parallel the downstream direction but offset therefrom. These second portions preferably have different lengths such that the total overall length in the downstream direction of the first, second and third offset portions are unequal to one another. Moreover, all of the offsets are to the same side of the direction of flow of the articles on the underlying conveyor.

Finally, by way of example, it is noted that a significant reduction in the underlying line pressure felt by the articles entering the packer on the order of 75–80% can be achieved where the acute angles of the offset portions are 30°.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 shows in a plan top view, the configuration for the offset portions of the lane guides in relation to upstream and downstream portions provided in accordance with the present invention at a convenient location upstream of the infeed section of a typical prior art packer.

FIG. 2 is a side elevational view of the lane guide assembly of FIG. 1.

DESCRIPTION OF THE PREFERRED EMBODIMENT

FIGS. 1 and 2 illustrate a continuously driven infeed conveyor 10 which is adapted to provide a continuous supply of product to be packed to a packer indicated generally at 12 in FIGS. 1 and 2.

Conventionally, lane guides are provided to define parallel flow paths for a plurality of columns of articles to such a packer. The articles in each column or lane are aligned in rows as suggested at 14 in FIGS. 1 and 2 as a result of the fact that the packer accommodates a predetermined number of articles either by means of a grouper station in the packer or in a drop packer simply by virtue of the fact that only so many articles can be accommodated at the load station of such a packer.

Problems have arisen in connection with packing compressible product such as plastic or polymeric liquid filled bottles for example. Such plastic bottles tend to compress when subjected to excessive line pressures of the type commonly found in the infeed sections of conventional packers generally.

This line pressure is created by an underlying conveyor moving at a speed slightly in excess of the speed at which the articles can be accommodated in the packer 12. A significant reduction in line pressure is achieved by providing restrictions to the flow of article in the form of slightly offset segments or sections in the lane guide assembly.

A typical lane guide assembly includes support segments, as indicated generally at 16, and these segments are generally spaced approximately 24 inches apart, so as to provide an 18 inch area of the lane guides that can be reformed from the initial parallel configuration to define offset segments or sections as suggested in FIG. 1.

It is characteristic of prior art packers generally that the line pressure not only can be excessive when accommodating readily compressible bottles of the type described previously but, even where the line pressure varies as a result of changes in the upstream supply of articles handled, the present invention affords advantages in reducing the line pressure to a level more amenable to a typical packer.

As shown in FIG. 1, each column of articles in each of the lanes defined by the lane guides is presented with at least four changes in direction at four corners that the cylindrical articles encounter as they traverse the offset section or segment 20 shown in FIG. 1. This offset section 20 in FIG. 1 comprises a first offset portion that is oriented at an acute angle with respect to the downstream direction generally defined by the lane guides upstream and downstream of the offset of the segment 20. Each of the four lanes shown is subjected to the same 30° offset in a plurality of first offset portions so as to cause a first corner to impede the flow of articles and thereby increase the back pressure exerted against articles in each of the four columns as shown at 22.

A second offset portion returns the flow of articles to a path parallel to the initial path of the underlying conveyor 10, but in the process of so doing, subjects the articles to a second 30° turn in direction and to further increase the back pressure.

A third angular change in direction is presented by a third offset portion that is generally equal in length to the first mentioned offset portion, and that serves to present a third "corner" for changing the direction of the articles travelling downstream toward the packer.

Finally, the fourth offset portion 24 comprises the actual infeed section to the packer 12, and serves to return the articles to the downstream direction, and in fact comprises a continuation of the initial lane guide configuration 22. This fourth offset portion, 24 in FIG. 1, is preferably on the order of at least one length of each slug or group of articles to be packaged in the packer 12 and corresponds therefor to at least the overall length of the case (not shown), which is to be loaded with such a group or slug of articles.

Still with reference to the offset portion indicated generally at 20 in FIG. 1, it will be apparent that the preferred range for the angle indicated generally at 30° in FIG. 1, is between 20° and 40° so as to achieve the requisite increase in back pressure to reduce the line pressure of the articles as they enter the packer. With a 30° offset and with four corners presented to the flow of articles as described above, reductions in the line pressure on the order of 75–80% are possible. Such a reduction in line pressure at the packer 12 will allow conventional packers to handle readily compressible plastic bottles of the type which are generally filled with liquid beverages for example. Such articles exhibit excessive compressibility when subjected to ordinary line pressures of the type realized in present day packers which were primarily designed to handle either glass containers or relatively rigid plastic bottles.

Finally, it is noted that the offset segment 20 includes a longer traverse for the articles in one outside lane as compared to the other outside lane. While not essential to the present invention, this geometry affords advantages from the point of view of noise and vibration since not all the articles strike all the walls or corners at the same time. Another advantage to this geometry is the different path lengths for the articles traversing these offset portions. The overall flow rate of articles per unit time need not suffer as servere a redution.

In light of the above, it is therefore understood that within the scope of the appended claims, the invention may be practiced otherwise than as specifically described.

We claim:

1. In a packaging line wherein compressible articles of cylindrical shape are to be packaged in a packer capable of accepting the articles at a predetermined rate, the improvement comprising:

an infeed conveyor moving in a downstream direction at a speed at least slightly greater than the rate at which the packer can accommodate the articles, such relative speed differential creating article line pressure $P_0$ on said infeed conveyor, lane guides that define a plurality of parallel lanes in which the articles are restricted to move in aligned columns downstream on said infeed conveyor and such that each column has an associated line pressure of at least approximately $P_0$.

said lane guides including first offset portions that define first lane segments oriented at an acute angle to the downstream direction, and second offset portions that define second lane segments downstream of and adjacent to said first portions, said acute angle being in the range of 20° to 40° and adapted to provide a back pressure $\Delta P$ on the articles upstream of said offset portions that reduces the line pressure downstream thereof to $P_0$-$\Delta P$ so that the packer operates at a line pressure of less than $P_0$.

2. The combination according to claim 1, wherein said acute angle is at least approximately 30°, and wherein said lane guides further include third offset portions downstream of said second offset portions, and said lane guide defining fourth offset portions aligned with said downstream direction, each said second, third and fourth offset portions defining lane segments that change the direction of the articles between each of them by at least approximately said acute 30° angle.

3. The combination according to claim 2, wherein said first and third offset portions have a length in the downstream direction of at least approximately twice the lateral spacing between the adjacent lane guides.

4. The combination according to claim 3, wherein said fourth offset portions provide parallel paths for the columns of articles entering the packer at reduced line pressure, said fourth offset portions having a length substantially greater than the lengths of said first, second and third offset portions.

5. The combination according to claim 4, wherein said second offset portions have different lengths with respect to one another such that the total lengths in the downstream direction of said first, second and third offset portions are unequal, said second offset portions also being generally parallel said downstream direction.

6. The combination according to claim 5, wherein said articles in each of said columns change direction in sequence rather than simultaneously so as to reduce the noise and vibration associated with movement of the articles through the offset portions of the lane guides.

* * * * *